May 5, 1959  A. O. WOLLENTIN ET AL  2,885,528
CONTACT ASSEMBLY FOR WELDING APPARATUS
Filed Nov. 19, 1957  2 Sheets-Sheet 1
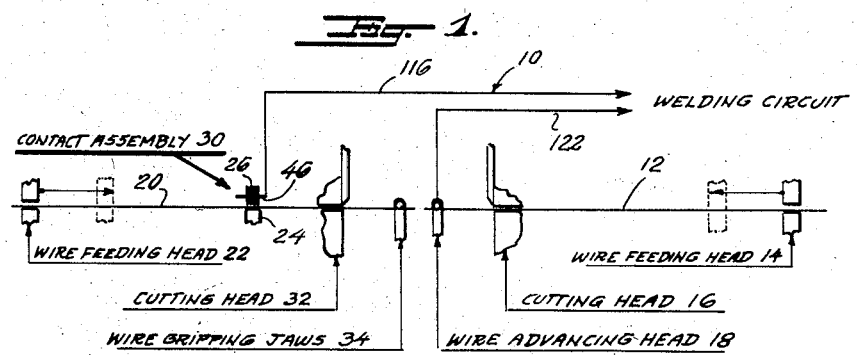
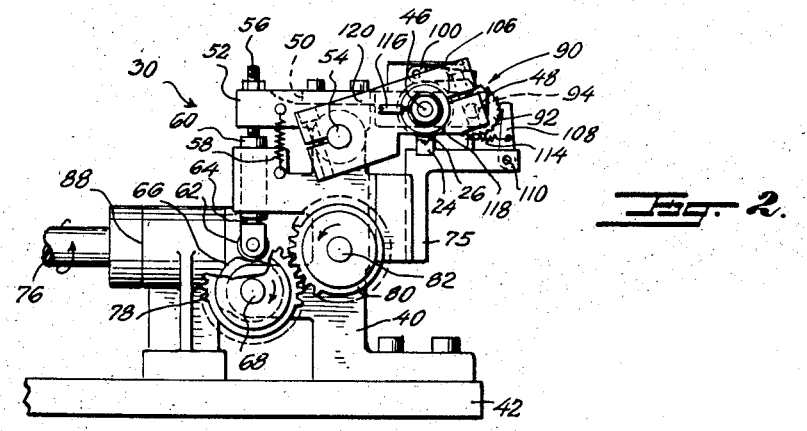
INVENTORS.
ALVIN O. WOLLENTIN,
ALEXANDER HANEK.
BY
ATTORNEY.

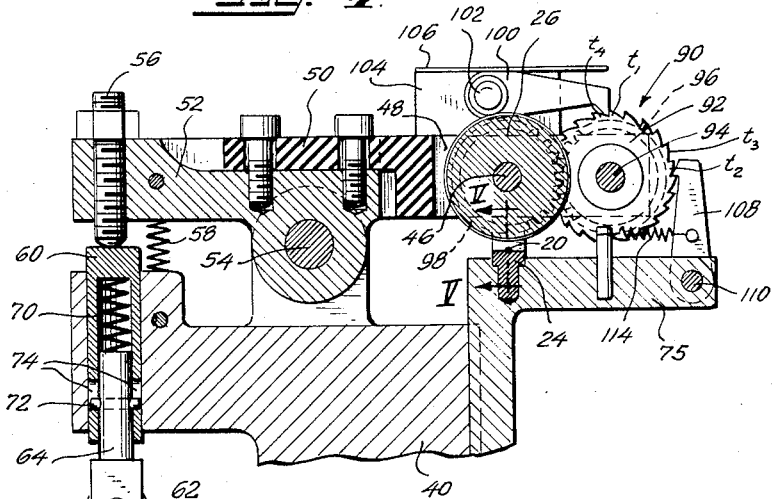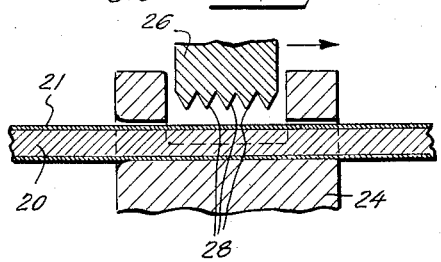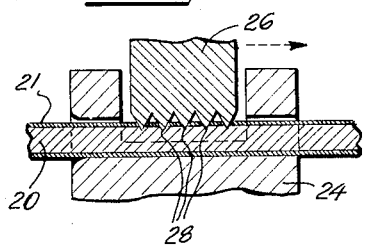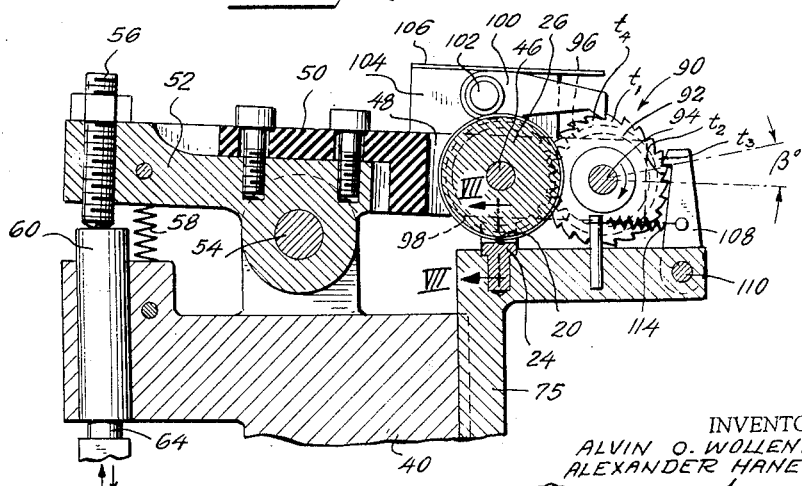

United States Patent Office 2,885,528
Patented May 5, 1959

2,885,528

CONTACT ASSEMBLY FOR WELDING APPARATUS

Alvin O. Wollentin, Bloomfield, and Alexander Hanek, Newark, N.J., assignors to Westinghouse Electric Corporation, East Pittsburgh, Pa., a corporation of Pennsylvania Application November 19, 1957, Serial No. 697,349

8 Claims. (Cl. 219—57)

The present invention relates to percussive-welding apparatus for the manufacture of sectional-lead wires and, more particularly, to a contact assembly for such apparatus.

In the manufacture of sectional lead wires for incandescent lamps and the like, the number and composition of the sections of the wire varies considerably for each particular application. As an example, a two-piece lead wire may consist of a nickel section and a seal-wire or dumet section for sealing to the vitreous press of the lamp stem. Dumet is the well known trade-name for a composite wire having a nickel-iron core enclosed in a copper sheath, the total thickness of which is 25% of the finished wire diameter. Since the dumet wire tends to weather when subjected to the sealing fires during fabrication of the lamp stem, the dumet is provided with an electrically non-conductive protective coating, suitably a borate, which coating is absorbed by the vitreous parts of the seal during the sealing operation in the formation of the lamp stem.

In the past, sectional lead wires have been fabricated on a machine of the type shown in U.S. Patent No. 2,034,560, issued March 17, 1936, to W. D. Bumstead. During the welding operation of such a machine, when a nickel section for example, is welded to the dumet section, it is necessary, due to the electrically non-conductive borate coating on the dumet section, to employ a contact assembly having a cam-operated serrated plunger which will pierce the non-conductive borate coating and engage the conductive dumet therebelow. Owing to variations in the wire diameter and improper adjustment of the serrated plunger the fragile dumet wire may be deformed by too deep a pierce. Again in the case of insufficient penetration of the coating by the serrations, arcing between the serrations on the plunger and the wire may result, thereby causing the oxidation and deformation of the serrations and requiring attendant expensive and lengthy maintenance necessitated by replacement or repair of the serrated plunger. In addition, the serrated plunger does not always provide equal contact pressure against the wire for each weld, thus causing the serrations to be too often burned and oxidized by the accumulation of heat therein resulting from successive welds at the rate of 200 per minutes.

It is the general object of the present invention to avoid and overcome the foregoing and other difficulties of and objections to prior art practices by the provision of a contact assembly for welding apparatus for the manufacture of sectional lead wires, which contact assembly is capable of providing a uniform contact pressure on a coated section of such lead wire during each weld and hence uniform penetration thereof, which eliminates arcing between the contact assembly and the coated section and which prevents the accumulation of heat in the contact portion of the contact assembly.

Another object of the present invention is a contact assembly which presents a new contact surface for each successive weld thereby insuring the full use of the entire contact surface with attendant reduction of the maintenance time, loss of production and elimination of the necessity for hand adjustment.

The aforesaid objects of the invention and other objects, which will become apparent as the description proceeds, are achieved by providing a spring-loaded piercing wheel having a plurality of knives on its periphery and means for moving the wheel into engagement with the coated section on the forward stroke and for indexing the wheel a predetermined number of degrees on the retracting stroke to present a new contact surface for the next weld.

For a better understanding of the invention reference should be had to the accompanying drawings wherein like numerals of reference indicate similar parts throughout the several views and wherein:

Fig. 1 is a diagrammatic side-elevational view of a conventional percussive-welding apparatus for the manufacture of sectional lead wires and incorporating the contact assembly of the present invention.

Fig. 2 is a side-elevational view of the contact assembly of Fig. 1 shown in the upper or retracted position.

Fig. 3 is a plan view of the contact assembly of Fig. 2.

Fig. 4 is an enlarged vertical-sectional view of the contact assembly along the line IV—IV of Fig. 3 in the direction of the arrows.

Fig. 5 is a further enlarged vertical-sectional view of a portion of a piercing wheel and wire guide along the line V—V of Fig. 4 in the direction of the arrows.

Fig. 6 is a view similar to Fig. 4 and showing the contact assembly in the "down" or "wire-engaging" position.

Fig. 7 is a view similar to Fig. 5 along the line VII—VII of Fig. 6 in the direction of the arrows.

Although the principles of the invention are broadly applicable to the manufacture of sectional wires, the invention is particularly adapted for use in conjunction with a two-piece lead wire for incandescent lamps and the like and hence it has been so illustrated and will be so described.

With specific reference to the form of the invention illustrated in the drawings, and referring particularly to Fig. 1, a percussive-welding apparatus for the manufacture of a two-piece lead wire and of the type shown in the above mentioned U.S. Patent No. 2,034,560 is indicated generally by the reference numeral 10. Since the welding apparatus 10 per se forms no part of the present invention it is deemed sufficient to briefly describe the structure and operation thereof.

As shown in Fig. 1 a nickel wire 12 passes through a wire-feeding head 14 and a cutting head 16 and is secured in the jaws of a wire advancing head 18. In like manner a dumet wire 20 having a borate coating 21 (Figs. 5 and 7) passes through a wire-feeding head 22, a guide 24 associated with a contact assembly 30 of the present invention, and a cutting head 32, and is gripped in a pair of wire-gripping jaws 34. It will be understood that the nickel wire 12 and the dumet wire 20 are moved inwardly, as viewed in Fig. 1, to the position shown therein by closure of the jaws of the wire-feeding heads 14 and 22 about the wires 12 and 20, respectively, and the movement of the heads 14 and 22 from the solid-line position shown in Fig. 1 to the dotted-line position shown therein. After closure of the jaws of the wire-advancing head 18 and of the wire-gripping jaws 34 about the wires 12 and 20 respectively, the jaws of the wire-feeding heads 14 and 22 open and the heads 14 and 22 are retracted to the solid-line position shown in Fig. 1. The wire-advancing head 18 moves the nickel wire 12 into engagement with the dumet wire 20 still gripped in the wire-gripping jaws 34. A piercing wheel 26 of the contact assembly 30 moves from the position shown in Figs. 1–5 to the position shown in Figs. 6 and 7 to permit the contiguous portion of a plurality of peripheral knives 28 formed in the periphery of the piercing wheel 26 to pierce the borate coating 21 (Fig. 7) and contact the dumet wire therebeneath preparatory to the percussive welding together of the now abutting nickel wire 12 and the dumet wire 20 upon energization of a welding circuit (not shown) but of the type employed in the above mentioned U.S. Patent No. 2,034,560. After welding the cutting heads 16 and 32 respectively sever the inwardly protruding sections, as viewed in Fig. 1, of the now welded wires to form the two-piece lead wire.

Contact assembly

To provide mounting means for the contact assembly 30, a bracket 40 is secured to a frame portion 42 (Figs. 2-4 and 6) of the welding apparatus 10. In order to oscillate the piercing wheel 26 from its disengaged position shown in Figs. 2-4 to its engaged welding position shown in Figs. 6-7, the piercing wheel 26 is affixed to a shaft 46 journalled in bifurcated end portions 48 (Fig. 3) of an electrically non-conductive insert 50 adjustably secured to a lever 52 pivotable on a shaft 54 journalled in the bracket 40. For the purpose of maintaining an adjustable lug 56 on the lever 52 in engagement with a hollow plunger 60 of an oscillating mechanism, which plunger 60 is slidable in the bracket 40, springs 58 extend between the lever 52 and the bracket 40. The form of oscillating mechanism shown in Figs. 2 and 4 provides a uniform contact pressure on the dumet wire 20 during each weld and holds a roller 62 (on the lower end oft a rod-like plunger 64 slidable in the hollow plunger 60) in continuing engagement with a lifting cam 66 on a cam shaft 68 journalled in the bracket 40, by employing a compression spring 70 housed in the plunger 60 between the upper end of the rod-like plunger 64 and the upper end of the hollow portion of the plunger 60. In the operation of the contact assembly 30 it is necessary in order to prevent damage to the piercing wheel 26 by engagement thereof with a foreign object, to connect the plunger 64 to the hollow plunger 60 by means of a pin extending through the rod-like plunger 64 and into opposed vertical slots 74 in the hollow plunger 60, thereby permitting limited relative sliding movement therebetween as controlled by the spring 70.

The means utilized for continuously driving the cam shaft 68 from a main-drive shaft 76 (Figs. 2 and 3) of the welding apparatus 10, comprises a gear 78 on the shaft 68 which meshes with a gear 80 on a shaft 82 journalled in the bracket 40 and a bevelled gear 84 (Fig. 3) meshing with a bevelled gear 86 on the main-drive shaft 76 which shaft is journalled in a suitable bearing 88 upstanding from the frame 42 of the percussive-welding apparatus 10.

Thus, counterclockwise rotation of the main-drive shaft 76 with its bevelled gear 86 about a horizontal axis, as viewed from the left end of Figs. 2 and 3 and as shown by the arrow, rotates the bevelled gear 84, the shaft 82, and gear 80 in counterclockwise direction, as viewed from Fig. 2 (and as shown by the arrow in Fig. 3) with resultant clockwise movement of the shaft 68 and the lifting cam 66, as viewed in Fig. 2. A raised portion of the lifting cam 66 causes the roller 62, the plungers 64 and 60 and lug 56 to move upwardly, thus rotating the lever 52, insert 50 and the piercing wheel 26 from the position shown in Fig. 4 to the position shown in Fig. 6 so that the knives 28 on the piercing wheel 26 move from the position shown in Fig. 5 downwardly through the borate coating 21 on the dumet wire 20 supported on the guide 24 and into contact with the dumet wire therebeneath to the position shown in Fig. 7. As shown in Fig. 4 the guide 24 is mounted on a bracket 75 projecting from the bracket 40.

For the purpose of presenting a new contact surface on the piercing wheel 26 for the next weld and thus preventing undue wear of, and the accumulation of heat in, a particular portion of the knives 28 by the employment of the same portion for successive welds, the contact assembly 30 is provided with an indexing mechanism 90 which is operable by the above-described oscillating movement of the lever 52.

Indexing mechanism

In order to provide a mounting means for a ratchet wheel 92 (Figs. 2-4 and 6), it is carried by a shaft 94 which is journalled in the bifurcations 48 of the insert 50. For the purpose of simultaneously indexing the piercing wheel 26 and the ratchet wheel 92, a gear 96 (Fig. 3) on the shaft 94 meshes with a gear 98 on the shaft 46. To operate the indexing mechanism 90 by means of the oscillating movement of the lever 52, a locking pawl 100 (Figs. 4 and 6) is mounted by a pivot 102 to a block 104 upstanding from the bifurcation 48 of the insert 50, as shown in the upper portion of Fig. 2. Such locking pawl is biased by a leaf spring 106 so that the free end thereof normally engages a tooth $t_1$ on the upper portion of the ratchet wheel 92, as seen in Figs. 4 and 6. As also seen from these latter figures, an advancing pawl 108 is mounted by a pivot 110 to the bracket 75 and is biased by a spring 114 so that the free end of such advancing pawl 108 engages a tooth $t_2$ on the right-hand side of the ratchet wheel 92.

Thus, as the insert 50, lever 52 and contact wheel 44 are rotated clockwise by the above described oscillating mechanism from the position shown in Fig. 4 to the position shown in Fig. 6, the locking pawl 100 carried by the insert 50 prevents counterclockwise rotation of the ratchet wheel 92 and permits the tooth $t_2$ on the ratchet wheel 92 to move away from the free end of advancing pawl 108 and causes the next adjacent tooth $t_3$ to be engaged by the advancing pawl 108. After the nickel wire 12 has been butt-welded to the dumet wire 20, the lever 52, insert 50 and piercing wheel 44 are retracted from the position shown in Fig. 6 to the position shown in Fig. 4 by the springs 58 (after roller 62 has moved to a low surface of cam 66) and the ratchet wheel 92, now restrained by engagement of the tooth $t_3$ with the advancing pawl 108, rotates in clockwise direction $\beta°$ as shown in Fig. 6. The simultaneous clockwise rotation of the gear 96, which is affixed to the same shaft 94 as the ratchet wheel 92, causes the gear 98 and hence piercing wheel 26 to rotate a similar number of degrees in a counterclockwise direction, as viewed in Figs. 4 and 6, to thus present a new contact portion of the peripheral knives 28 for the next welding operation. Meanwhile during the above-mentioned clockwise rotation of the ratchet wheel 92, the tooth $t_1$ slides off the free end of the locking pawl 100 and it engages the next adjacent tooth $t_4$.

Welding circuit

The circuit utilized to achieve the percussive butt welding of the nickel wire 12 to the dumet wire 20 is not shown in Fig. 1 but is of the type shown in the above described U.S. Patent No. 2,034,560. Since such circuit per se forms no part of the present invention it is deemed sufficient to say that a conductor 116 extends from the conventional circuit, indicated by the legend "welding circuit," to the shaft 46, which is additionally electrically insulated from the frame portion 42 of the welding apparatus 10 by a non-conductive bushing 118 (Figs. 2 and 3) carried by a block 120 affixed to the shaft 54. This circuit is completed by a conductor 122 which extends from the "welding circuit" to the wire-advancing head 18 which is similarly electrically insulated in the conventional manner from the frame portion 42 of the welding apparatus 10.

After the nickel wire 12 has been butt welded to the dumet wire 20, the cutting heads 16 and 32 sever the welded wires, and the wire gripping jaws 34 and the wire advancing head 18 release the now fabricated two-piece lead wire which may be removed therefrom by conventional means, such as an air blast (not shown).

It will be recognized by those skilled in the art that the objects of the present invention have been achieved by the provision of a contact assembly for a percussive welding apparatus for the manufacture of sectional lead wires, which contact assembly provides a uniform contact pressure on the coated section during each weld with attendant uniform penetration thereof, thus eliminating arcing between the contact assembly and the coated section. Further, the contact assembly presents a new portion of the piercing wheel for each successive weld, thereby preventing the accumulation of heat in a particular portion of the piercing wheel and insuring the full use of the contact surface of the piercing wheel with attendant reduction of the required maintenance and prevention of undue loss of production. In addition, the contact assembly of the present invention eliminates the necessity of continuing hand adjustment thereof.

While in accordance with the patent statutes, one best known embodiment of the invention has been illustrated and described in detail, it is particularly to be understood that the invention is not limited thereto or thereby.

We claim:

1. In apparatus for supporting an elongated article provided with an electrically non-conductive sheath in end to end relation to another elongated article and welding the articles together, a contact assembly for connecting the sheathed article in an electrical circuit comprising a piercing member having a contact surface disposed adjacent said sheathed article, drive means connected to said piercing member and operable to move said contact surface into engagement with said sheath to pierce the latter and to engage the article therebeneath before and during the welding of the articles together, said drive means being further operable to retract said piercing member after the welding of the articles together, and indexing means associated with said piercing member and operable by the movement of said piercing member to cause movement of said contact surface thereby presenting a new contact surface on said piercing member for each weld.

2. The combination with apparatus for welding an elongated article provided with an electrically non-conductive sheath to another elongated article, of means for supporting said articles in end to end relation preparatory for the welding together thereof, and a contact assembly for connecting the sheathed article in an electrical circuit, said contact assembly comprising a piercing member having a plurality of peripheral knives providing a contact surface disposed adjacent said sheathed article, drive means connected to said piercing member and operable to move said contact surface into engagement with said sheath to pierce the latter and to engage the article therebeneath during the welding of the articles together, said drive means being further operable to retract said piercing member after the welding of the articles together, and indexing means associated with said piercing member and operable by the retracting movement of said piercing member to cause movement of said contact surface thereby presenting a new contact surface on said piercing member for each weld.

3. The combination with apparatus for welding an elongated article provided with an electrically non-conductive sheath to another elongated article, of means for supporting said articles in end to end relation preparatory for the welding together thereof, and a contact assembly for connecting the sheathed article in an electrical circuit, said contact assembly comprising a piercing member having serrations providing a contact surface disposed adjacent said sheathed article, drive means connected to said piercing member and operable to move said contact surface into engagement with said sheath to pierce the latter and to engage the article therebeneath during the welding of the articles together, said drive means being further operable to retract said piercing member after the welding of the articles together, and indexing means associated with said piercing member and operable by the retracting movement of said piercing member to cause movement of said contact surface thereby presenting a new contact surface on said piercing member for each weld.

4. In apparatus for supporting an elongated article provided with an electrically non-conductive sheath in end to end relation to another elongated article and for welding the articles together, a contact assembly for connecting the sheathed article in an electrical circuit comprising a lever, a piercing member on said lever and having a plurality of peripheral knives providing a contact surface disposed adjacent said sheathed article, drive means connected to said lever by a spring and operable to move said contact surface into engagement with said sheath to pierce the latter and to engage the article therebeneath during the welding of the articles together, said drive means being further operable to retract said lever after the welding of the articles together, and indexing means associated with said piercing member and operable by the movement of said piercing member to cause movement of said contact surface thereby presenting a new contact surface on said piercing member for each weld.

5. In apparatus for supporting an elongated article provided with an electrically non-conductive sheath in end to end relation to another elongated article and for welding the articles together, a contact assembly for connecting the sheathed article in an electrical circuit comprising a piercing wheel having a contact surface disposed adjacent said sheathed article, drive means connected to said piercing wheel and operable to move said contact surface into engagement with said sheath to pierce the latter and to engage the article therebeneath during the welding of the articles together, said drive means being further operable to retract said piercing wheel after the welding of the articles together, and indexing means having a ratchet wheel, means connecting said ratchet wheel with said piercing wheel to cause their simultaneous movement and means in engagement with said ratchet wheel and for preventing rotation thereof during movement of the piercing wheel in one direction with respect to said sheathed article and also for causing rotation of said ratchet wheel and said piercing wheel during movement of the piercing wheel in the opposite direction, thereby presenting a new contact surface on said piercing wheel for each weld.

6. In apparatus for supporting an elongated article provided with an electrically non-conductive sheath in end to end relation to another elongated article and for welding the articles together, a contact assembly for connecting the sheathed article in an electrical circuit comprising a piercing wheel having a contact surface disposed adjacent said sheathed article, drive means connected to said piercing wheel and operable to move said contact surface into engagement with said sheath to pierce the latter and to engage the article therebeneath during the welding of the articles together, said drive means being further operable to retract said piercing wheel after the welding of the articles together, and indexing means having a ratchet wheel, means connecting said ratchet wheel with said piercing wheel to cause their simultaneous movement, a locking pawl in engagement with said ratchet wheel and for preventing rotation thereof during movement of the piercing wheel toward said sheathed article, and an advancing pawl also in engagement with said ratchet wheel and for causing rotation of said ratchet wheel and said piercing wheel during movement of the piercing wheel away from said sheathed article thereby presenting a new contact surface on said piercing wheel for each weld.

7. In apparatus for supporting an elongated article provided with an electrically non-conductive sheath in end to end relation to another elongated article and for welding the articles together, a contact assembly for connecting the sheathed article in an electrical circuit, said contact assembly comprising a piercing member having a plurality of peripheral knives providing a contact surface disposed adjacent said sheathed article, drive means connected to said piercing member and operable to move said contact surface into engagement with said sheath to pierce the latter and to engage the article therebeneath during the welding of the articles together, said drive means being further operable to retract said piercing member after the welding of the articles together, and indexing means having a ratchet wheel, means connecting said ratchet wheel with said piercing member to cause their simultaneous movement and means in engagement with said ratchet wheel and for preventing rotation thereof during movement of the piercing member in one direction with respect to said sheathed article and also for rotating said ratchet wheel and said piercing member during movement of the piercing wheel in the opposite direction, thereby presenting a new contact surface on said piercing member for each weld.

8. In apparatus for supporting an elongated article provided with an electrically non-conductive sheath in end to end relation to another elongated article and for welding the articles together, a contact assembly for connecting the sheathed article in an electrical circuit, said contact assembly comprising a lever, a piercing wheel on said lever and having a plurality of peripheral knives providing a contact surface disposed adjacent said sheathed article, drive means connected to said lever by a spring and operable to move said contact surface into engagement with said sheath to pierce the latter and to engage the article therebeneath during the welding of the articles together, said drive means being further operable to retract said piercing wheel after the welding of the articles together, and indexing means having a ratchet wheel, means connecting said ratchet wheel with said piercing wheel to cause their simultaneous movement, a locking pawl in engagement with said ratchet wheel and for preventing rotation thereof during movement of the piercing wheel toward said sheathed article, and an advancing pawl also in engagement with said ratchet wheel and for rotating said ratchet wheel and said piercing wheel during movement of the piercing wheel away from said sheathed article thereby presenting a new contact surface on said piercing wheel for each weld.

References Cited in the file of this patent

UNITED STATES PATENTS

| | | |
|---|---|---|
| 2,034,560 | Bumstead | Mar. 17, 1936 |
| 2,708,228 | Crabbe et al. | May 10, 1955 |